Electro-Magnetic Engines.
No. 166,431.  Patented Aug. 3, 1875.
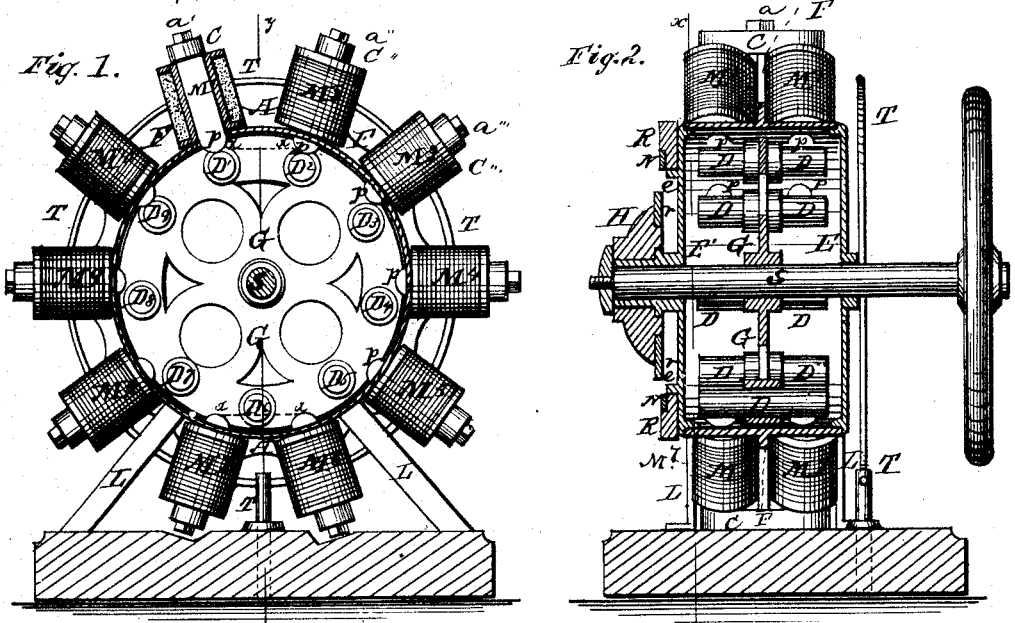
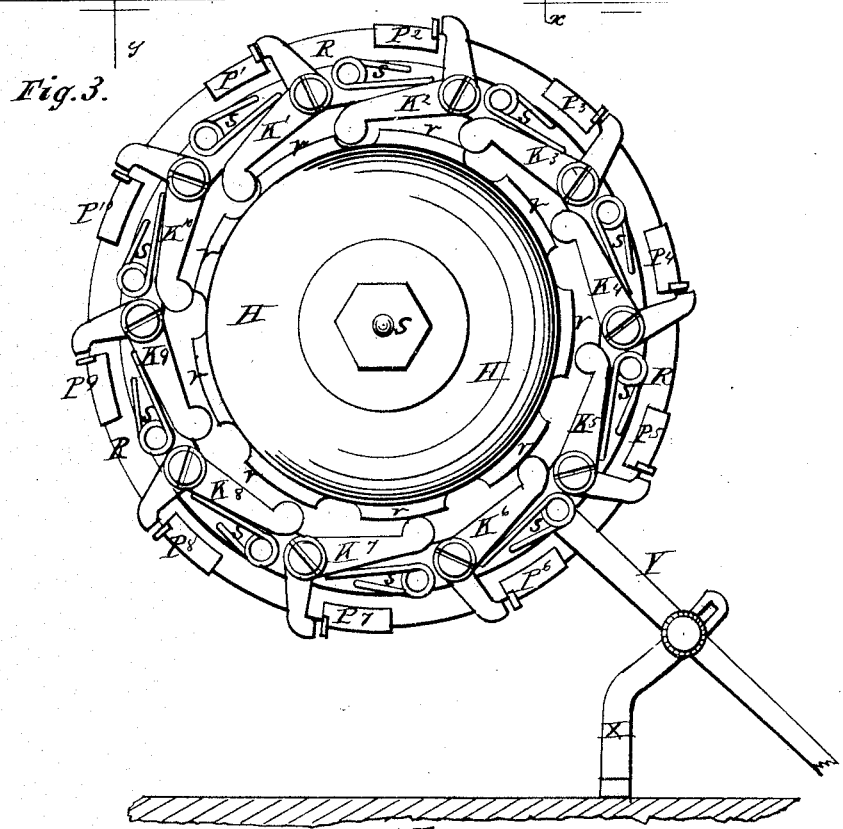
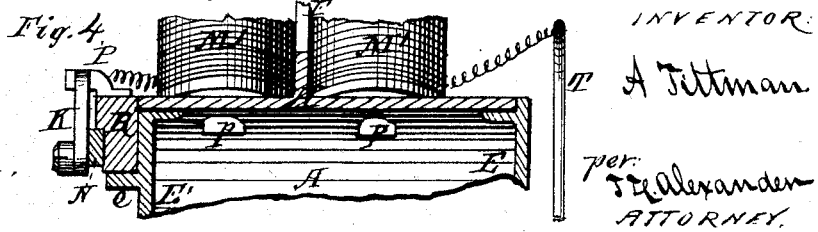
WITNESSES:
P. C. Dietrich
W. C. McArthur
INVENTOR:
A. Tittman
per T. L. Alexander
ATTORNEY

UNITED STATES PATENT OFFICE.

ALEXANDER TITTMAN, OF CHAUNCEY, ASSIGNOR TO HIMSELF AND HENRY S. DAGGETT, OF LA FAYETTE, INDIANA.

IMPROVEMENT IN ELECTRO-MAGNETIC ENGINES.

Specification forming part of Letters Patent No. 166,431, dated August 3, 1875; application filed April 15, 1875.

*To all whom it may concern:*

Be it known that I, ALEXANDER TITTMAN, of Chauncey, in the county of Tippecanoe and State of Indiana, have invented certain new and useful Improvements in Electro-Magnetic Engines; and do hereby declare that the following is a full, clear, and exact description thereof, reference being had to the accompanying drawings and to the letters of reference marked thereon, which form part of this specification.

The nature of my invention consists in the construction and arrangement of an electro-magnetic engine, as will be hereinafter more fully set forth.

In the annexed drawings, Figure 1 is a side elevation of the engine. Fig. 2 is a longitudinal section of the same. Fig. 3 is an enlarged side elevation of an interior device in the engine. Fig. 4 is a detached section of a part of the engine.

A represents a cylinder, supported by legs L of suitable length. This cylinder carries on its circumference ten electro-magnets, $M^1$ to $M^{10}$, placed radially at equal distances apart, and with the poles in a plane at right angles to shaft S, which is supported centrally by the cylinder-heads E. The poles of the electro-magnets are inserted through holes of the same size, the cross-pieces $C'$ of them being drilled in the center to admit the round parts of a scalloped flange, F, the nuts $a^1$ $a^2$, &c., holding them firmly in their positions. The poles $p^1$ to $p^{10}$ of the magnets protrude to the inside of the cylinder, so as to just meet, but not touch, the nine armatures $D^1$ to $D^9$, which are mounted equidistant and parallel on the circumference of a wheel, G, inside of the cylinder, and they are made V-shaped, so that the armatures will be nearest to the magnets when their radial planes are in one. As represented in the drawing, $M^1$ is exactly in a radial plane with the armature $D^1$, and every armature, right or left, will be one-ninth of the space $x$ $y$ more distant from the preceding magnet. The consequence of this fact is, that while one armature passes the distance from the poles of one magnet to those of the next, the nine armatures have each passed consecutively the center of one magnet, and hence at every revolution of the shaft S each magnet will have been passed nine times, or all the armatures will have passed all the magnets ninety times.

From the foregoing it will be seen that the electricity should pass a magnet only when the nearest armature is one-ninth of the space $x$ $y$, or one-ninetieth of the circumference formed by the edges of the poles distant from it, and cease as soon as the armature reaches the precise center. To accomplish this object I introduce a break-piece on the same principle. On the cylinder-head $E'$ is cast a rim, $e$, on which is fitted a ring, R, of non-conducting material, which carries a brass ring, N N, bearing equidistant ten keys, $k^1$ to $k^{10}$, in the shape of bell-cranks, and also insulated from this ring ten plates, $P^1$ to $P^{10}$. On the shaft S is secured a disk, H, of non-conducting material, with a metal rim, $r$, into which are cut accurately equidistant nine apertures. The springs $s$ press the ends of the keys into these apertures when they pass, and, doing so, the keys come in contact with the plates P. These apertures are cut so wide that one key will not be lifted from its plate before the next one has fairly touched the plate belonging to it.

In order to avoid all counter-currents and disorders the electricity is not passing any part of the machine except as follows: One pole of the battery is attached to the post $x$, passing up the reverse lever $y$ to the insulated ring N, bearing the keys. The helix of one pole of each magnet is attached to the nearest plate, while that of the other pole is fastened to the ring J, from whence it may be conducted to the other pole of the battery or another machine.

The cylinder A should be made of some non-magnetic material, as well as the armature bearing-wheel G.

By this construction of an electro-magnetic engine I secure the following important advantages: The use of the attracting power of the magnets at the smallest distance from the armatures; by the peculiar arrangement of an unequal number of armatures and magnets I secure the work of as many magnets in one revolution as the product of multiplication of the number of magnets and that of the armatures; and by the peculiar construction of the break-piece I secure an unbroken current, so that the electricity of one battery may be conducted over more than one machine without detriment to its effectiveness, when there is no loss by insufficient connection or incomplete insulation.

Having thus fully described my invention, what I claim as new, and desire to secure by Letters Patent, is—

1. In combination with an unequal number of magnets and armatures, arranged, respectively, on a stationary cylinder and a revolving disk, a stationary ring provided with a series of keys and plates corresponding with the number of magnets, and a revolving disk provided with a series of recesses corresponding with the number of armatures, substantially as and for the purposes herein set forth.

2. In an electro-magnetic engine, the combination of the bell-crank-shaped keys $k^1$ $k^2$, &c., plates $P^1$ $P^2$, &c., springs $s$ $s$, and central disk provided with recessed edge, all arranged to operate as set forth.

In testimony that I claim the foregoing as my own I affix my signature in presence of two witnesses.

ALEX. TITTMAN.

Witnesses:
HENRY PREISS,
E. BROMMER.